(12) United States Patent
Siversson

(10) Patent No.: US 7,555,704 B2
(45) Date of Patent: Jun. 30, 2009

(54) METHOD FOR LINKING TWO INFORMATION TYPES

(75) Inventor: Per Siversson, Helsingborg (SE)

(73) Assignee: Spectronic AB, Helsingborg (SE)

( * ) Notice: Subject to any disclaimer, the term of this patent is extended or adjusted under 35 U.S.C. 154(b) by 476 days.

(21) Appl. No.: 10/475,169

(22) PCT Filed: Apr. 12, 2002

(86) PCT No.: PCT/SE02/00742

§ 371 (c)(1),
(2), (4) Date: Apr. 23, 2004

(87) PCT Pub. No.: WO02/086703

PCT Pub. Date: Oct. 31, 2002

(65) Prior Publication Data

US 2004/0180688 A1    Sep. 16, 2004

(30) Foreign Application Priority Data

Apr. 17, 2001   (SE) ................................. 0101345

(51) Int. Cl.
*G06F 17/00* (2006.01)
(52) U.S. Cl. ........................................ 715/200
(58) Field of Classification Search .............. 715/500, 715/700, 200
See application file for complete search history.

(56) References Cited

U.S. PATENT DOCUMENTS

| | | | | |
|---|---|---|---|---|
| 3,999,050 A * | 12/1976 | Pitroda | ........................ | 708/112 |
| 5,699,244 A * | 12/1997 | Clark et al. | ..................... | 702/2 |
| 5,873,108 A * | 2/1999 | Goyal et al. | ................. | 715/507 |
| 5,900,870 A | 5/1999 | Malone et al. | | |
| 6,016,498 A | 1/2000 | Bakke et al. | | |
| 6,049,796 A * | 4/2000 | Siitonen et al. | ................ | 707/3 |
| 6,065,012 A * | 5/2000 | Balsara et al. | .............. | 707/102 |
| 6,128,102 A * | 10/2000 | Ota | ............................ | 358/403 |
| 6,278,991 B1 * | 8/2001 | Ebert | ............................ | 707/3 |
| 6,401,097 B1 * | 6/2002 | McCotter et al. | ............ | 707/102 |
| 6,466,236 B1 * | 10/2002 | Pivowar et al. | .............. | 715/835 |
| 6,642,945 B1 * | 11/2003 | Sharpe | ........................ | 715/788 |
| 6,724,403 B1 * | 4/2004 | Santoro et al. | .............. | 715/765 |
| 6,892,196 B1 * | 5/2005 | Hughes | ......................... | 707/4 |

OTHER PUBLICATIONS

Phelps, et al., "The Multivalent Browser: A Platform for New Ideas", Proceedings of the 2001 ACM Symposium on Document engineering, published Nov. 2001, p. 58-67.*

Flynn, et al., "The Satchel system architecture: mobile access to documents and services", Mobile Networks and Applications, vol. 5, Issue 4, published Dec. 2000, p. 243-258.*

* cited by examiner

*Primary Examiner*—Amelia Rutledge
(74) *Attorney, Agent, or Firm*—Browdy and Neimark, P.L.L.C.

(57) ABSTRACT

The invention relates to a method for determining information in a handheld or pocket type electronic device, which method comprises the acts of recording a first determination of information which is made via a user interface, presenting selectable information types so that they are directly selectable, which presentation takes place as a result of the first determination of information being finished, recording a choice of an information type, presenting a user interface for determining information in response to the choice of information type, recording a second determination of information which is made via the user interface, and of automatically linking the second determination of information to the first determination of information as a direct result of the recording of the second determination of information.

10 Claims, 7 Drawing Sheets

METHOD FOR LINKING TWO INFORMATION TYPES

FIELD OF THE INVENTION

The invention relates to a method for determining information in a handheld or pocket type electronic device.

BACKGROUND ART

Today's handheld or pocket type electronic devices, e.g. telephones, handheld computers, digital diaries, etc., are becoming more and more sophisticated. In addition, they are designed to handle many different tasks. For example, a mobile phone does not need to be a mobile phone only but it can also contain functions which are usually found in an electronic diary or a handheld computer. Furthermore, an electronic diary or a handheld computer does not need to contain only functions which are usually found in these devices, but can also function as telephones.

Although the devices more and more comprise the same or similar functions, the functions are often divided, i.e. if an e-mail is to be sent, an e-mail is written by means of a program intended for this purpose, if a booking in the diary is to be written, such a booking is written in a program for the diary, if a note is to be written, a note is written in a program for notes, etc.

As a result, more programs or more dedicated program parts are needed as users desire to be able to create new types of information. Thus, the user has to learn to handle a large number of different program applications and the different interfaces of these applications. Moreover, in most systems the user has to create a system for sorting information in order to easily find different files; he or she also has to manage this system. All these different programs and their different files or objects result in devices for such applications requiring a large memory. Besides, many steps are usually required for the user to switch between applications for different information types.

Yet another problem of today's technology is that it is often difficult to connect different information types, e.g. attach specific information to an e-mail, to an appointment in a diary, to an address, to images, to sound, etc.

Another problem is that today's users of information collecting and/or information transmitting devices have to handle large amounts of information, which is inconvenient when specific information is looked for.

SUMMARY OF THE INVENTION

The objects of the present invention is thus to provide a method in a handheld or pocket type electronic device by means of which method a user quickly and easily can create complicated information types and which method results in a memory efficient system.

According to the invention, these objects are achieved by a method as claimed in claim 1. Preferred embodiments of the method are stated in the dependent claims.

In particular, these objects are achieved by a method for determining information in a handheld or pocket type electronic device, which method comprises the acts of recording a first determination of information which is made via a user interface, presenting selectable information types so that they are directly selectable, which presentation takes place as a consequence of a first determination of information being finished, recording a choice of an information type, presenting a user interface for determining information in response to the choice of information type, recording a second determination of information which is made via a user interface, and automatically linking the second determination of information to the first determination of information as a direct result of the recording of the second determination of information.

Determining information means both that the user indicates an object of information that is available in the system and that the user creates new information for a new or existing object of information.

A particular advantage of directly after a first determination of information allowing a second determination of information and of automatically linking the second determination of information to the first determination of information when the second determination of information has been recorded is that a user with just a few manipulations can easily create complicated determinations of information consisting of different types of information and function. The invention also results in the advantage of a user easily being able to find and link available information of a specific information type to selected information without the user needing to be disturbed by irrelevant information types.

A user who uses the invention to make a determination of information does not need to determine in advance what he or she finally desires to provide but can during the creation process follow his or her natural train of thought. For instance, if a user gets an idea that is important to him or her and that he or she would like to note and share with someone else, the first thought would be to write down the idea. By using the invention, the user's first measure could be to choose to create a sound file in which the user quickly and easily records his or her message and, thus, makes a determination of information. Once the idea is recorded, he or she has achieved his or her primary object and starts thinking about with whom he or she is going to share the idea. By using the invention, as a consequence of having recorded the first determination of information, the user gets the opportunity to directly choose a second determination of information for linking to the first one. The user can thus record his or her message and once the recording is finished, a number of information types is presented to him or her which can be linked to his or her note. Among these he or she finds, for example, "address" which may contain data regarding companies or people. Since his or her intention was to share the idea with someone, he or she selects "address" and gets the opportunity to select a person who is recorded in the system; he or she could also here create a new "address" if the person is not recorded in the system. Thus, the user can select a person and a receiving address connected to the person and is ready with the second determination of information and has provided a voice message to which a receiving address is linked. The user can now choose to send the message without needing to supply further data. The message stated in the example could just as well be an image, a text or some other object. If a user's intention is not to send information, also the address stated in the example can be another function. In a preferred embodiment of the invention, the selectable information types are presented again after the second determination of information, exactly as after the first determination of information. The user may then continue to link further determinations of information, objects of information, to the first and the second determination of information and, thus, obtain an even more complex object of information. This method can be repeated an unlimited number of times if the restrictions as to storage are left out of account. According to a preferred embodiment, such a complicated object of information may also be searched for and be found by going through a presentation of any information type of the linked objects of information.

In order to clarify the capacity of the invention to adapt to the user's present thoughtway, it should be pointed out that the determinations of information may also be carried out in the reverse order. This means that if the user first thinks of the receiver, he or she can first select the receiver and then write his or her note.

Furthermore, by linking determinations of information, which can contain considerable quantities of data, to one another instead of storing copies of determinations of information, the system becomes very memory efficient since a link in most cases requires less memory than a determination of information.

The method according to the invention also results in an even and concise flow of user activities without any need for unnecessary jumps or activities. This results in a user experiencing an evenly progressive determination of information.

Determinations of information which have been linked together as indicated above constitute a virtual object of information collecting, the properties and contents of which are determined by the determinations of information being linked together. On the basis of a few fundamental information types, more complicated and advanced information types in the form of objects of information collecting can thus be created. This results in the user needing to learn only a few ways of indicating information.

According to one embodiment of the invention, as a consequence of a finished determination of information also at least one indicator is presented which can be used by a user to identify at least one determination of information as part of a virtual object of information collecting. Preferably, such an indicator is presented on a screen at the same time as the selectable information types are presented. The advantage of this method is that the user can at least keep track of with what information he or she is working. In a preferred embodiment, indicators are shown regarding all the objects on the screen which are linked to one another during the current linking process, which gives the user a general view of what he or she has done. The latter display is advantageously presented on a screen at the same time as the selectable information types are presented, which leads to the user being able to get a fast general view of the linked objects. Preferably, the display is made in such a manner that the objects included can be scrolled if all of them cannot be shown at the same time.

Said presentations of identities result in the user getting a general view of the determinations of information which are included in the object of information collecting when he or she is to decide whether to add more determinations of information or carry out some other measure.

According to yet another embodiment of the invention, as a result of a finished determination of information, selectable functions are presented which are connected to at least one of the determinations of information which are linked at the moment. This gives the advantage of the user being able to activate the desired function in the generated object of information collecting as soon as he or she has carried out a determination of information regarding an information type which is connected to the desired function without first having to proceed via an activity menu. In its turn, this leads to the user only needing to carry out a minimum of acts for activating the object and the user's handling being extremely simple.

According to another preferred embodiment, each object of information comprises an indication of time. As regards inputted information, this indication of time can correspond to the time at which the object of information was created, and concerning data or meetings, it can correspond to the time for the meeting. The advantage of this indication of time is that the device can present a list of all the measures carried out, e.g. inputted information and future data or meetings sorted by chronological order. In its turn, this gives the user an excellent general view of the information that he or she handles.

According to a preferred embodiment, an object of information regarding newly inputted information is saved together with an automatically generated identity in response to inputting of the new information being finished. By using automatically generated identities for new objects, the user never needs to think of naming an object of information for identification, which in many cases is more difficult than creating the information. Consequently, there is no reason for the user to think of how the objects of information are stored or what storage structure is used.

In yet another embodiment of the invention, the act of automatically linking a second determination of information comprises the act of saving a link to the second determination of information in an object of information collecting, in which object a link to the first determination of information is already stored. By this method, the user can easily distinguish different virtual objects of information collecting comprising one or more common objects of information.

Handheld or pocket type electronic devices, e.g. electronic diaries (PDAs, personal digital assistants), handheld computers, mobile phones, etc., are easy to carry along, which leads to the user desiring to be able to make determinations of information when the user is pressed for time, e.g. in the break of a meeting, seminar or the like. The advantage of the invention in such situations is that it allows the user to quickly provide the desired determinations of information at the same time as he or she is permitted to introduce/select information in an order that for the moment is obvious to him or her. By means of a few simple operations, the method also makes it possible for the user to carry out determinations of information and, where applicable, activate them. A user can also tie a heading and a text to an object of information, which preferably does not itself contain text, by linking a text object comprising the desired heading to the current object of information. By means of this measure, an object of information which per se does not comprise any heading or text can be presented with a heading also in presentation states which present a list of objects of information not comprising a heading or a text. The advantage of this is that the user is allowed to give objects, preferably such that per se do not contain information which is easily identifiable to the user, information which is easily identifiable to the user.

One solution to the problem of a user being exposed to large amounts of information is to introduce "automatic deletion". The purpose of "automatic deletion" is to provide a system where the user never himself or herself needs to delete/remove information which he or she has created or received, but this takes place automatically. The user is thus never stopped from creating or receiving information due to the fact that there is too much information or that the memory is getting full.

BRIEF DESCRIPTION OF THE DRAWINGS

The invention will be described in more detail in the following with reference to the accompanying drawings which by way of example show a currently preferred embodiment.

DESCRIPTION OF PREFERRED EMBODIMENTS

The preferred invention can be implemented in any type of handheld or pocket type electronic device which has at least a screen, an input means, a memory and a processor. For example, such an electronic device can be a handheld computer, a PDA (Personal Digital Assistant), a pocket telephone, a telephone for the landline telecommunication network system, a multimedia telephone, etc. By way of example, one embodiment of the invention will be described in the following as a multimedia telephone. The purpose of this is not to limit the invention to a multimedia telephone, below referred to as telephone, but to give a concrete example on which the description of the invention can be based.

Figure 1:
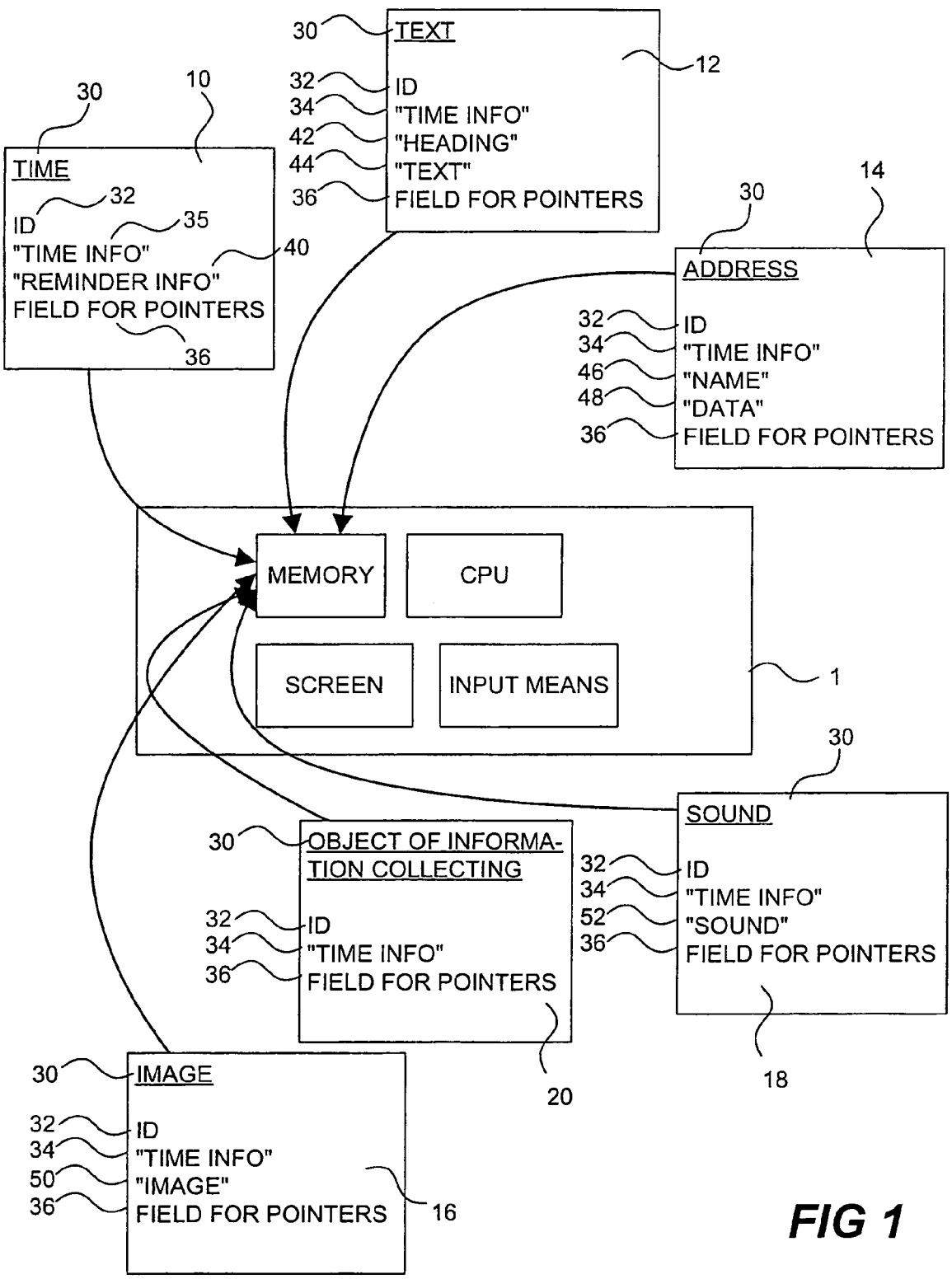
FIG. 1 is a schematic block diagram of a handheld or pocket type electronic device as well as objects of information and their structure according to a preferred embodiment.

FIG. 1 schematically shows preferred information types 10, 12, 14, 16, 18, an object of information collecting 20 and a schematic image of a telephone 1. According to a specific embodiment of the invention, a telephone is adapted to handle five information types 10, 12, 14, 16, 18. Each information type and object of information collecting 20 comprises an identifier of information type 30 which identifies the current information type, an ID field 32 which is individual for each generated object of information and a time information field 34 in which the time for providing the current object is stored, not taking the information type time into consideration where the time information field 35 can be set to the desired time. In addition, each information type and object of information collecting comprises a field 36 for pointers, which will be described in more detail in the following.

Furthermore, the information types can be divided into two main directions, where three types are considered as basic information types 10, 12, 14 and two types are considered as additional information types 16, 18. The basic information types 10, 12, 14 are preferably time 10, text 12 and address 14. The basic information types 10, 12, 14 are characterised in that sorting by presentations of objects can be made based on these. When it comes to the additional information types 16, 18 which are image 16 and sound 18, these are essentially sorted by the "time info" field 34 but can also, when they are linked to other objects, be sorted by one of these objects.

Apart from the fields 30, 32, 35, 36 mentioned above, the information type time 10 comprises a "reminder info" field 40 which contains information about reminder signaling, e.g. how long beforehand signaling has to take place, type of signal, etc. This information type, time 10, thus relates to storage of reminders or future tasks, and not time in general since time also is registered in the other information types.

Apart from the fields 30, 32, 34, 36, the information type text 12 comprises a heading field 42 and a text field 44. The heading field 42 contains a heading which has been written or selected when providing the field and the text field 44 comprises notes, i.e. the amount of text. This information type can also be used to provide reminders without future indications of time. The user can e.g. provide an object of information of the type text which has the heading "task". All texts with the heading "task" may then be presented in a list under this heading, which means that a list of tasks has been created. Naturally, other headings can be used for other purposes.

Apart from the fields 30, 32, 34 and 36, the information type address 14 comprises a name field 46 and a data field 48. The name field 46 contains a text which identifies for whom the information is intended, e.g. the name of a person, a company or the like. The data field can contain a large number of typical address and communication data, e.g. various phone numbers, e-mail addresses, SMS numbers, fax numbers, mailing addresses, Internet addresses, WAP addresses, etc. Advantageously, address objects can be linked directly to an image/a photo or a sound, which gives extra information about the current addressee. As is evident from the description, it is also possible to link other objects.

Apart from fields 30, 32, 34 and 36, the information type image 16 comprises an image field 50 which contains data for an image. Preferably, a text object is linked to such an object, but also other objects can be suitable for linking.

Apart from fields 30, 32, 34 and 36, the information type sound 18 comprises a sound field which contains data regarding sound, voice mail, music or the like. Preferably, a text object is linked to such an object, but also other objects can be suitable to link.

The object of information collecting 20 comprises nothing apart from fields 30, 32, 34 and 36. Its purpose is to function as a collection object for linked information; in other words, this object corresponds to an object for the more complicated information that can be created by means of the invention.

When creating information according to one of the above-mentioned information types, an object of the current information type is created. In these objects, at least parts of the fields which are defined for the current information type contain data. In the following, object means an object which is of one of the above-mentioned information types.

When a telephone according to a preferred embodiment is in a home position, a time list is shown where all the objects which are stored in the telephone are shown in chronological order. Since all information cannot be shown at the same time, this list is provided with suitable scroll bars, shortcuts as regards days, etc. Implementing such scroll bars, shortcuts, etc., is easy to provide for those skilled in the art. Apart from objects which are the information type time, all stored objects in the list are sorted by the time they were created. As already mentioned, objects of the information type time relate to reminders and/or future tasks and are therefore placed under an indicated time, preferably in future, the time being indicated in connection with the creation. In order to provide such sorting, all objects also of the type time can be sorted by the "time info" field 34, 35 found in each object.

In said home position, different options are also presented. One of these options is that a main menu can be opened, showing selectable icons/texts referring to at least the above-mentioned information types. This menu thus comprises entries for studying, editing or creating objects regarding time, text, address, image and sound. In a preferred embodiment of the invention, the activity determination of information corresponds to the user selecting an object by marking it or the user creating an object by entering information for the current object.

Figure 2:
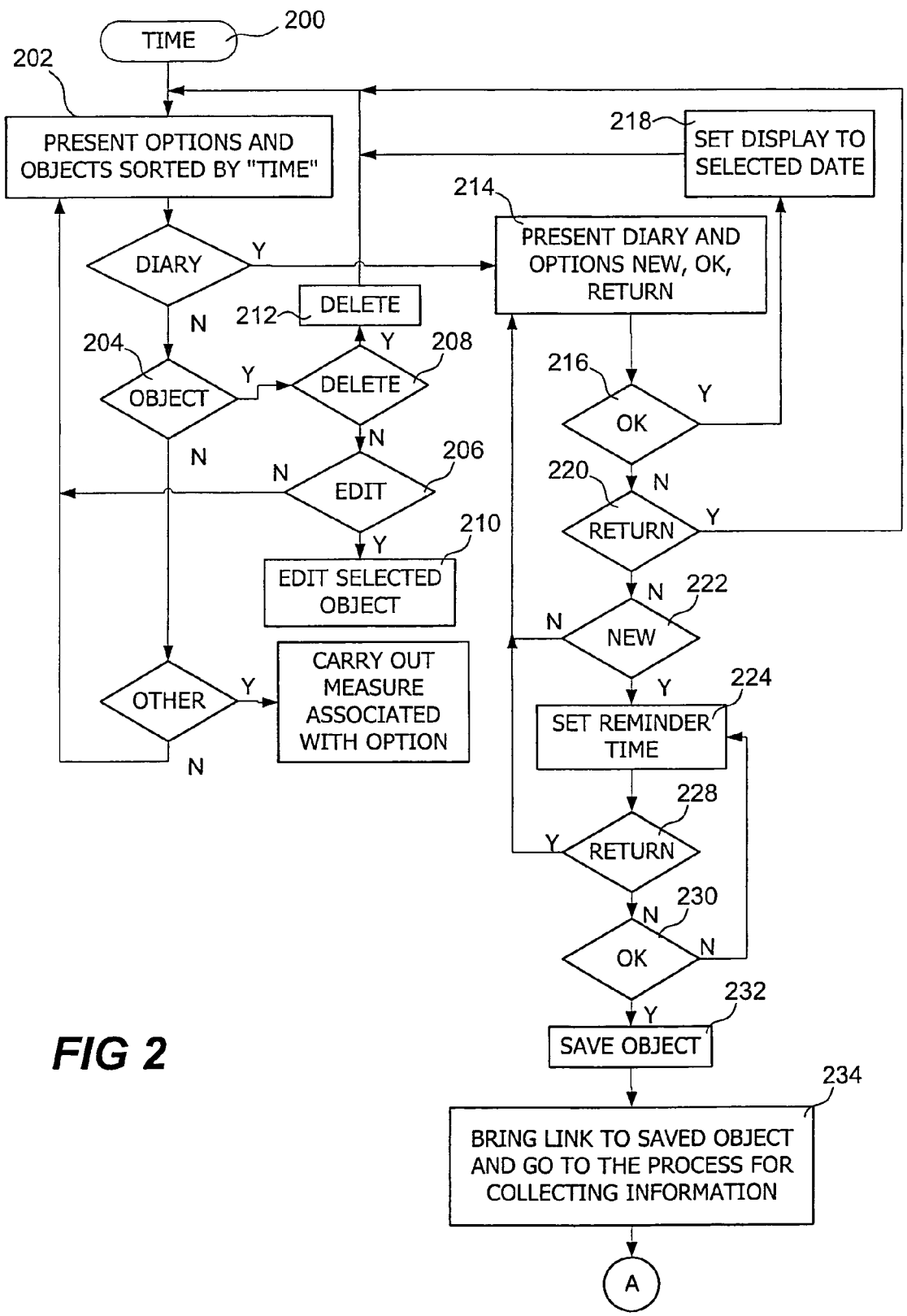
FIG. 2 is a flow chart of a preferred process for displaying time-bound objects and determination of information regarding time objects.

FIG. 2 shows a preferred process 200 for creating objects of the information type time. When selecting the entry time in the main menu, selectable alternatives and available objects stored in the memory regardless of information type are presented, step 202. The available objects are presented sorted by "time info", see FIG. 1. Preferably, one or a few days are shown at the same time on the screen. The number of shown objects can be varied depending on the size of the screen and/or the number of objects which are available for each day. Besides, some form of scroll button, scroll bar or the like for changing the time period for shown objects is presented. Each presented object is per se selectable. The selectable alternatives can, for example, be diary, menu, filter, return, etc. When selecting an object which is presented on the screen, step 204, a user has at least the option of going to the selected object in order to edit it, step 206, or to delete it, step 208. If the user selects editing, step 206, the telephone will present the object on the screen in an editing mode, step 210. This editing mode corresponds to the editing mode for the selected object, which editing modes will be presented in the following under the respective information types. When selecting delete, step 208, the selected object is deleted, step 212, and the process returns to the presentation in step 202.

If, in connection with the presentation according to step 202, diary is selected, a diary and the alternatives new, OK and return, step 214, are presented. The diary is adapted in such a manner that the user at least can switch between different months or years and mark the desired date. Such a diary is created in a manner known to those skilled in the art.

If the user selects OK, step 216, the process will return to step 202 via step 218, in which step the date marked in the diary is set as the date that is shown in the presentation in step 202.

When selecting return, step 220, the process returns to the presentation in step 202 without the display there being affected by a date selected in the diary. If "new", is selected, step 222, the telephone presents an interface for setting a time during the marked day, step 224; the interface can also present options of selecting alarm signal and how long time before the booking a signal is to be given; also other options known to those skilled in the art can be implemented. The selected day and time can now function as a booking or a reminder. Also other functions which are typical for bookings and reminders can be implemented here. Apart from the interface, in step 224, the options return 228 and OK 230 are presented. When selecting back, the process returns to the presentation in step 214. If the user selects OK 230, a unique identity is generated automatically, and a time object having said identity is created and saved, step 232, in which the selected date and time are placed in the "time info" field. Subsequently, the process proceeds to the process for collecting information, in which process a link/reference to the saved time object is included.

Other options in step 202 could be menu, filter, return. When selecting menu, a return to the main menu can occur; when selecting filter, an interface for selecting different filtering settings regarding the shown objects could be presented, and when selecting return one returns to the preceding interface without having recorded any object. For example, the process returns to the information collecting process shown in FIG. 7, if this was the preceding process.

Figure 3:
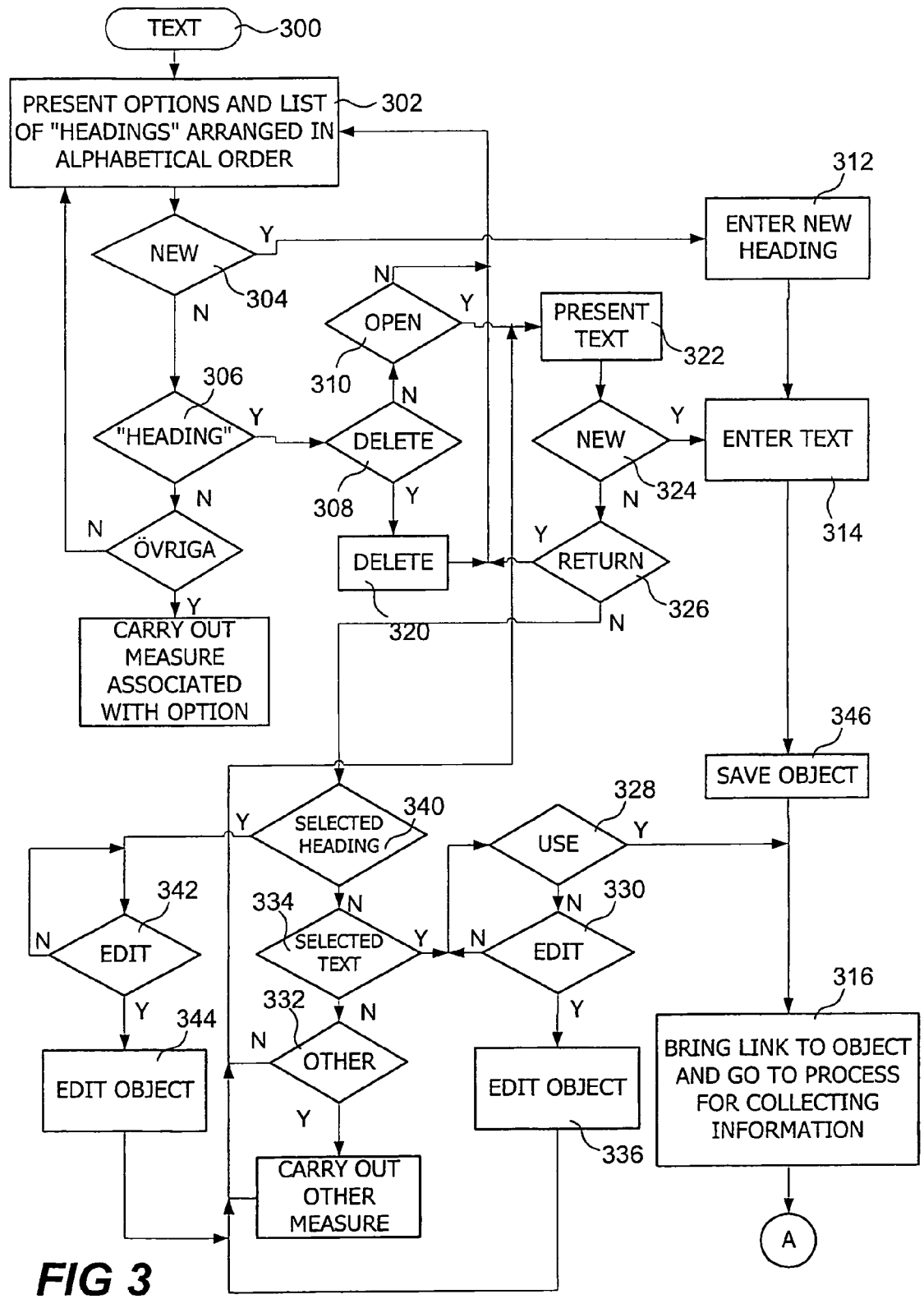
FIG. 3 is a flow chart of a preferred process for display and determination of information as regards text objects.

FIG. 3 shows a preferred process 300 for creating objects of the information type text. When selecting the entry text in the main menu, there are presented selectable alternatives and a list of headings for the available stored objects of the information type text, step 302, the list also comprising text objects which are linked to other objects, also objects of information collecting. The headings correspond to those stored in the "heading" field of the text object, which are arranged in alphabetical order in said list. The options presented in step 302 are, apart from the headings 306, preferably at least the alternatives new 304, menu, delete 308, open 310. The alternatives open and delete result in an action regarding a selected object. If new is selected, step 304, an interface is presented for entering a new heading, step 312. An interface is then presented for entering text, step 314. When the text has been inputted, the process proceeds to step 346, where a text object having a unique identity, which identity is automatically generated, is created and where the time for the creation of the object is placed in the "time info" field, the heading is placed in the "heading" field and the text in the "text" field. The process then proceeds to the process for information collecting where it brings along a link which refers to the saved text object.

If the user in step 302 instead marks a heading, step 306, and selects delete, step 308, then the heading and all text connected to this heading will be deleted, step 320. If the user in step 302 marks a heading and selects open, the texts are presented which are connected to objects which have the selected heading, step 322. In addition, the alternatives "new" 324, "return" 326, "use" 328 and "edit" 330, respectively, are presented. Under the alternative "other" 332, for example, the function of deleting a selected text can be found, the whole object in which the text is included being deleted. If the user selects return, step 326, the process returns to the presentation in step 302. However, if the user selects new, step 324, a new text object is created, the current heading is copied to the "heading" field in the new text object and an interface is presented for entering a text, step 314. When the text has been inputted, the process proceeds to step 346, where a text object with a unique identity, which identity is generated automatically, is created and where the time for the creation of the object is placed in the "time info" field, the heading is placed in the "heading" field and the text in the "text" field. The process then proceeds to the process for information collecting, to which process a link which refers to the new object is carried along.

If the user in step 322 selects the heading of the text object, step 340, and edit, step 342, the process proceeds to step 344 where an interface for editing the heading is presented. When the heading has been edited, the process returns to step 322.

If the user in step 322 selects a text, step 334, and use, step 328, the process proceeds to the process for information collecting and brings along a link which refers to the selected text object. However, if the user selects a text, step 334, and edit, step 330, the process proceeds to step 336 where an interface is presented for editing the text in the current object. Once the editing is finished, the process returns to step 322 where the texts regarding the current heading are presented.

Other options in step 302 could be "menu", "search", "return". When selecting "menu", a return to the main menu can occur; when selecting "search", an interface for searching regarding the current text objects could be presented, and when selecting "return", one returns to the preceding display mode without anything being recorded. For example, the process returns to the information collecting process shown in FIG. 7, if this was the preceding process.

Figure 4:
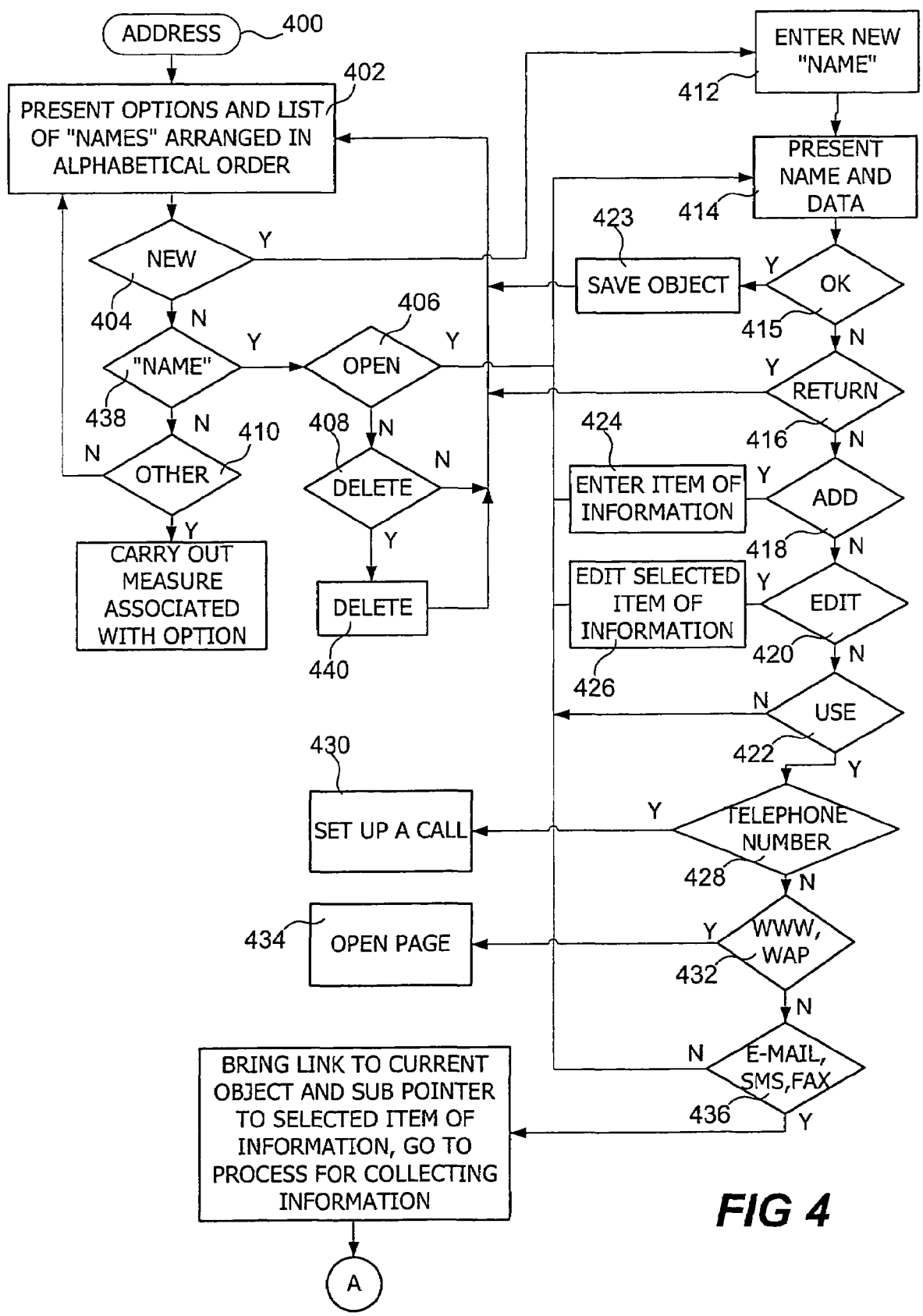
FIG. 4 is a flow chart of a preferred process for display and determination of information as regards address objects.

FIG. 4 shows a preferred process 400 for creating objects of the information type address. When selecting the entry address in the main menu, selectable alternatives and a list showing the "name" field from the available stored objects of the information type address are presented, step 402, which also comprises address objects which are linked to other objects. Preferably, the list which shows the object is arranged in alphabetical order and scrolling between different names and names which cannot be shown on the screen for space reasons, can be implemented in a manner known to those skilled in the art. Preferably, the selectable alternatives are at least "new" 404, "open" 406, "delete" 408 and other alternatives named "other" 410, which will be explained in the following.

When selecting "new", step 404, an interface is presented for entering a new name, step 412. When a new name has been entered, the name, all data corresponding to data intended for the data field, step 414, and a number of options are presented. In the case where only a name has been entered, there are no data corresponding to data intended for the data field. Preferably, the options which are presented in step 414 are at least "OK" 415, "return" 416, "add" 418, "edit" 420 and "use" 422.

When selecting OK, the address object is created and saved, step 423, if it is not an available object that is edited. In the address object, a unique identity which is automatically generated is entered in the "ID" field and the time for the creation is entered in the "time info" field. Moreover, the name is placed in the name field and the data which have been entered are placed in the data field.

When selecting "return", step 416, the process returns to the presentation in step 402.

When selecting "add", step 418, an interface is presented where the user can enter various data, step 424, such as those mentioned in connection with the description of the information type address in FIG. 1, or create a direct link to another object of information. Preferably, the different data are presented as a selectable list and the user is able to enter specific information when he or she has chosen the item of information that is to be entered. When an item of information is entered, the process returns to the presentation of names and data in step 414.

If the user has marked an item of information presented in step 414 and selects edit, step 420, an interface is presented for editing the marked item of information, step 426. When the item of information is edited, the process returns to step 414.

If the user has marked an item of information presented in step 414 and selects use, step 422, different things happen depending on what type of information has been selected. If the selected item of information is a phone number, step 428, the telephone connects a call to the selected phone number, step 430. In one embodiment of the invention, the choice of a phone number can also lead to the process proceeding to the process for information collecting, FIG. 7, and from there the user choosing to make a call. Preferably, this possibility of activity is shown by an option "call". If the selected item of information is an address of a web page on the Internet, URL, or if it is an address of a web page, step 432, the phone switches to a mode for showing web and web pages, respectively, and retrieves the current page to be shown on the display of the telephone, step 434. In one embodiment of the invention, the choice of a web page or a web page can also lead to the process proceeding to the process for information collecting in FIG. 7 and from there the user choosing to look at the site. Preferably, this possibility of activity is shown by an option "web" or "wap". If the selected item of information is an e-mail address, an SMS number or a fax number, step 436, the process proceeds to the process for information collecting and brings along a link which indicates the current object and the selected item of information.

The process in step 402 will now be described. If the user marks a name, step 438, and selects delete, step 408, the object containing the marked name field is deleted, step 440. However, if the user marks a name, step 438, and selects open, the process proceeds to step 414 and presents name and data belonging to the object which contains the marked name.

Other options 410 in step 402 could be "menu", "search", "return". When selecting "menu", a return to the main menu can take place; when selecting "search", an interface for searching regarding the current name objects could be presented, and when selecting "return", the process returns to the preceding process without anything being recorded. For example, the process returns to the information collecting process shown in FIG. 7, if this was the preceding process.

Figure 5:
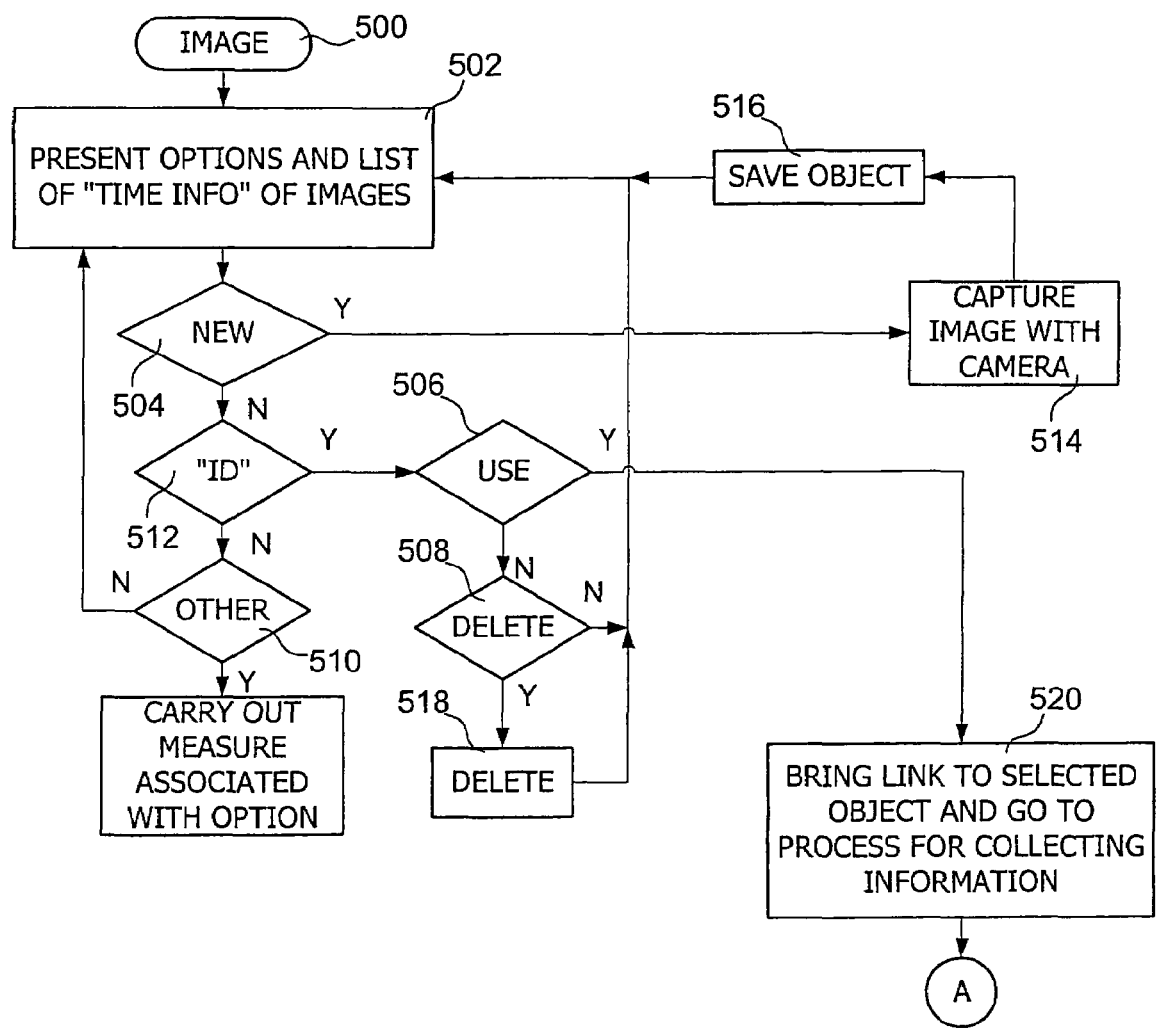
FIG. 5 is a flow chart of a preferred process for display and determination of information as regards image objects.

FIG. 5 shows a preferred process 500 for creating objects of the information type image. When selecting the entry image in the main menu, selectable alternatives and a list showing the "time info" field and the "ID" field in the available stored objects of the information type image are presented, step 502. If the image is linked to a text object, the heading in the text object may be presented in this list. The list which shows the objects is preferably arranged in chronological order and browsing between images/times which are shown and images/times which are not shown on the screen for space reasons can be implemented in a manner known to those skilled in the art. Preferably, the selectable alternatives are at least "new" 504, "use" 506, "delete" 508 and other alternatives named "other" 510, which will be explained in the following. In order to allow the utilisation of "use" 506 and "delete" 508, respectively, an image/a time must be marked in the list, step 512.

If the user selects new, step 504, an interface is presented for capturing an image, step 514. In this interface, the user can also return to step 502 without having captured an image. Once the user has captured the image, the user can choose to delete the image and capture a new image or to save the image, in the latter case an image object being created. In the created image object, a unique identity which is automatically generated is entered in the ID field, the time when the image was captured is entered in the "time info" field and the data which represents the image is entered in the image field. The object is saved, step 516, and the process returns to step 502.

If the user in connection with the presentation according to step 502 marks an image/a time, step 512, and then selects "delete", step 508, the current image object is erased from the memory, step 518. If the user marks an image/a time, step 512, and then selects "use", step 506, a determination of information has been carried out and the process proceeds to the process for information collecting and brings along a link which refers to the selected image, step 520.

Other options 510 in step 502 could be "menu", "return". When selecting "menu", a return to the main menu can occur and when selecting "return", the process returns to the preceding process without anything being recorded. For example, the process returns to the information collecting process shown in FIG. 7 if this was the preceding process.

Figure 6:
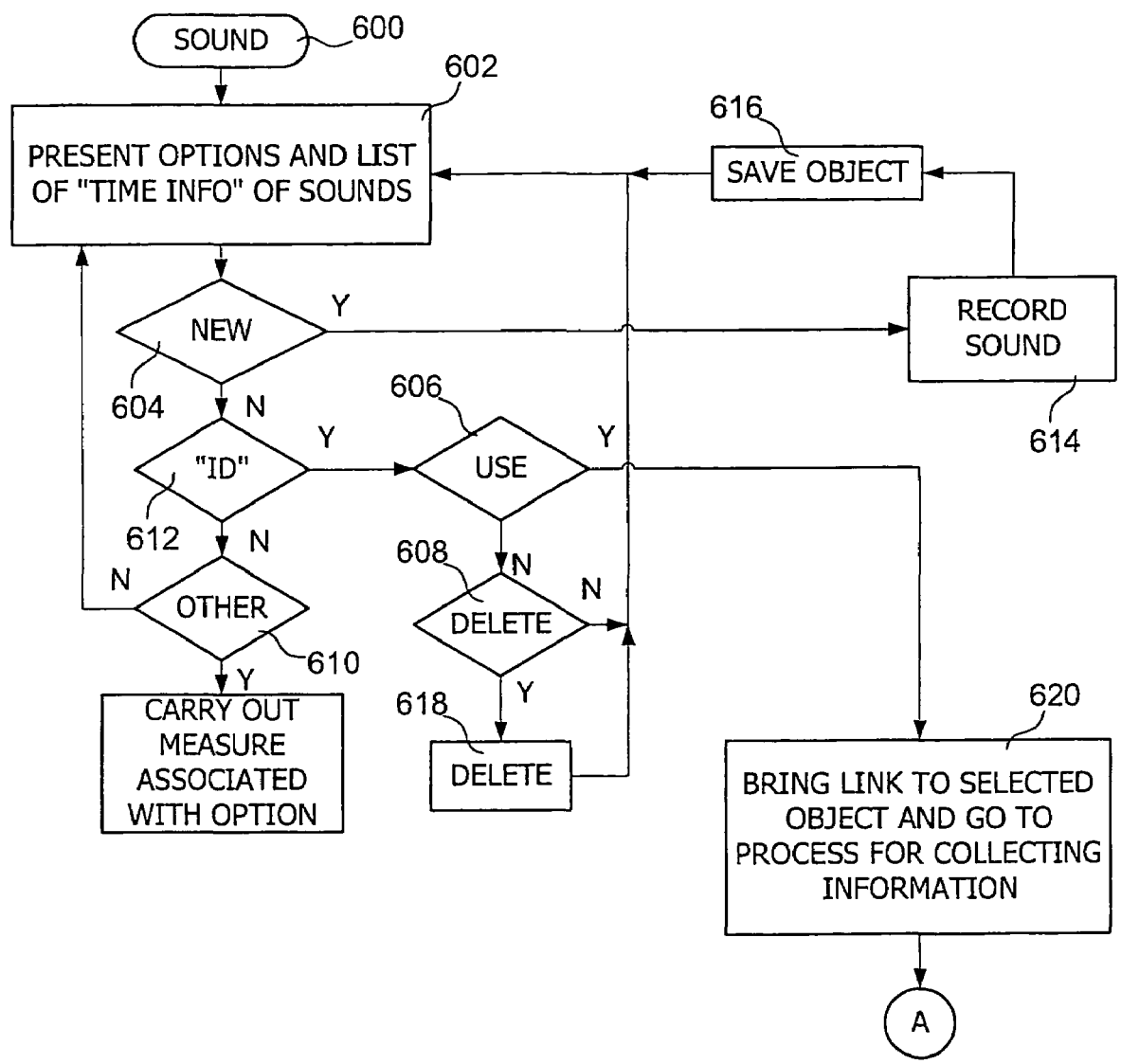
FIG. 6 is a flow chart of a preferred process for display and determination of information as regards sound objects.

FIG. 6 shows a preferred process 600 for creating objects of the information type sound. When selecting the entry sound in the main menu, selectable alternatives and a list showing the "time-info" field and the "ID" field in the available stored objects of this information type are presented, step 502. If the image is linked to a text object, the heading of the text object may be presented in this list. The list which shows the objects is preferably arranged in chronological order and browsing between different images/times and images/times which cannot be shown on the screen for space reasons, may be implemented in a manner known to those skilled in the art. Preferably, the selectable alternatives are at least "new" 604, "use" 606, "delete" 608 and other alternatives named "other" 610, which will be explained in the following. In order to allow utilisation of "use" 606 and "delete" 608, respectively, a sound/time must be marked in the list, step 612.

If the user selects new, step 604, an interface is presented for sound recording, step 614. In this interface, the user is given the possibility to return to step 502 without having recorded any sound. Once the user has recorded the sound, the user may select either to delete the recorded sound or to create a sound object. If the user chooses to create a sound object, a unique identity which is automatically generated is entered in the ID field, the time when the sound was recorded is entered in the "time info" field and the data which represents the sound is entered in the sound field. The object is saved, step 616, and the process returns to step 602.

If the user in connection with the presentation according to step 602 marks a sound/time, step 612, and then selects "delete", step 608, the current sound object is deleted from the memory, step 618. If the user marks a sound/time, step 612, and then selects "use", step 606, a determination of information has been made and the process proceeds to the process for information collecting and brings along a link which refers to the selected sound, step 520.

Other options 610 in the step 602 could be "menu", "play", "return". When selecting "menu", a return to the main menu may occur; when selecting "play", the selected sound is played, and when selecting "return", the process returns to the preceding process without anything being recorded. For instance, the process returns to the information collecting process shown in FIG. 7, if this was the preceding process.

Figure 7:
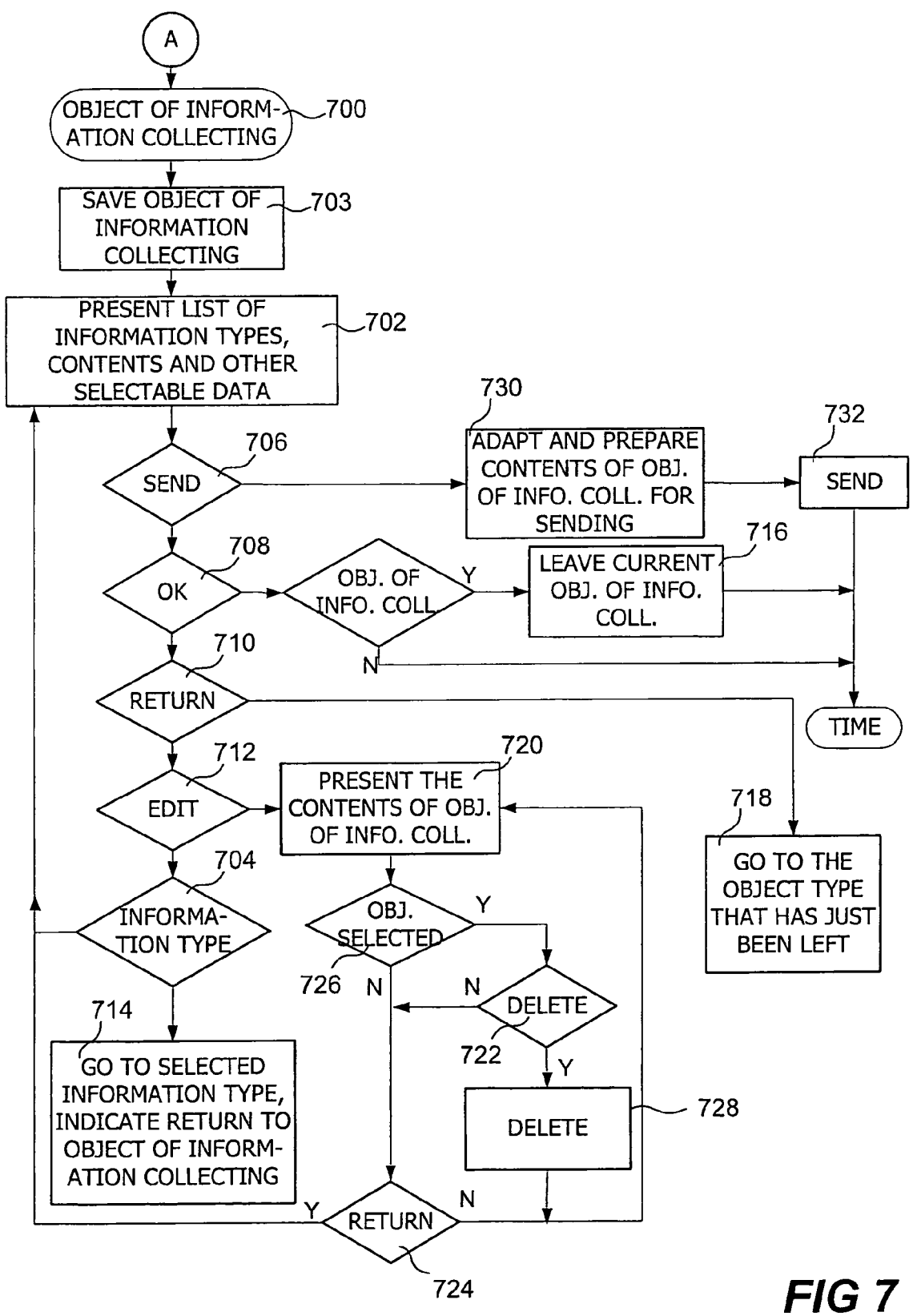
FIG. 7 is a flow chart of a preferred process for display and determination of information as regards objects of information collecting.

FIG. 7 shows a flow chart of the process information collecting 700. This process is reached either via one of the processes specific to a type of information, i.e. via a determination of information, or when selecting a collecting object. If the process reaches this step for the first time after a first choice or a first entering of information in one of the above-mentioned processes, i.e. the current determination of information has not earlier been handled by the information collecting process, then an object of information collecting is created and the link which an earlier process has brought along, is entered in this object. In addition, a unique identity which is automatically generated is entered in the ID field and the time for creating the object is entered in the "time-info" field, step 701. If the process does not reach this step for the first time, after a first choice or a first entering of information, i.e the current determination of information has earlier been handled by the information collecting process, then the link which the process has brought along from an earlier process is entered in the object of information collecting that is being processed, step 701. The next step is a presentation of at least a summary of the objects which are involved in the process, i.e. the objects which are linked to the object of information, a list or a menu containing selectable information types, e.g. "time", "text", "address", "image", "sound" and other selectable alternatives, step 702.

Preferably, the selectable alternatives are at least "send" 706, "OK" 708, "return" 710 and "edit" 712. The alternative "send" 706 is only shown if the current collecting object contains a link that refers to an address to which it is possible to send a message, e.g. an e-mail address, an SMS number or a fax number.

In a specific embodiment further alternatives such as "call", "web" and/or "wap" can be presented if the object of information collecting contains a link that refers to a phone number, a web page and/or a web page.

Preferably, said summary shows at least identifiers regarding some of the objects that are linked to the object of information collecting. For example, identifiers can be of the object type, a heading, a name, or the like.

When selecting one of the listed information types, step 704, the process proceeds to the process which corresponds to the selected information type and at the same time indicates that a return in that process will result in a return to the information collecting process, step 714.

If the user in step 702 selects "OK" 708, the current information collecting process will be finished and the process returns to a presentation according to step 202 in FIG. 2. The object of information collecting will then be stored in the telephone and be accessible via the time process or by the processes of the objects of which there are links to in the object of information collecting. If an object of information collecting has been processed, this will be released, step 716, and the next time the process enters the information collecting process will thus be determined as the first time, see above in connection with step 714. If an object of information collecting has not been processed, the process will return to a presentation according to step 202 in FIG. 2, and the object of information collecting which has been created has thus not been linked to any further object of information.

If the user selects "return", step 710, the process will return to the information process that has just been left, step 718.

If the user selects "edit", step 712, a summary of the objects linked in the object of information collecting is presented, step 720. In addition, the options "delete" 722 and "return" 724, respectively, are presented. If a linked object has been marked 726 and delete is selected, step 722, the link of the marked object is deleted from the current object of information collecting, step 728. If "return" is selected, step 724, the process returns to step 702.

If the object of information collecting contains one or more links to e-mail addresses, SMS numbers or fax numbers and the user selects send, step 706, then an examination of the linked objects is carried out and they are adapted to the type of sending that is to be performed, step 730. An object of information collecting may link to all the three sending types at the same time. In these cases, an adaptation is made of the linked objects regarding the respective sending types. When the linked objects have been adapted, they are sent to the receiving addresses in a manner known to those skilled in the art, step 732. The process is then finished and the telephone returns to an initial state where a presentation according to step 202 in FIG. 2 is shown.

In a preferred embodiment, the link to an object of information collecting is also saved in the objects which are linked to the object of information collecting. This makes it possible to use, in different modes of presentation, information associated with the object of information collecting and not only objects of information of the type to which the presentation relates. This means, for example, that a heading can be presented in the presentation of the image object, that an image can be presented in the presentation of an address, etc. Another advantage is that it is possible to fetch the entire "more complicated information" in one step for studying, for editing or for using.

In the different modes of presentation, the objects of information may also be sorted by information that does not belong to the present mode of presentation, if said information is available for an object of information of a type corresponding to the present mode of presentation via an object of information collecting and if the object of information of a type corresponding to the present mode of presentation is associated with an object of information collecting including the information on which the desired sorting should be based. One advantage of this is that, for instance, a user who looks at a list of images can sort the list by information in another type of objects which are associated with at least one of the images, e.g. a text, a name, etc. In a preferred embodiment, each presentation menu comprises a filter function for selecting different ways of sorting. Sorting by other information types as mentioned above is also possible.

According to another aspect of the invention, "automatic deletion" may be provided by the name, time, text, etc. of the various objects of information being sorted into different boxes. Each box may be filled with a certain amount of information to a minimum level "box_level". In connection with further "filling up", its "box_level" is exceeded, which leads to the oldest object of information getting into the "buffer box". This box has a dynamic size which is reduced as the other boxes are "filled up". The automatic deletion will only delete objects of information which have been placed in this box. Consequently, the sum of the minimum levels of all the boxes, "sum_min_level", becomes smaller than the total storage capacity, "mem_max". The level for when the "automatic cleaning" is activated, "cleaning_level", is larger than "sum_min_level" and smaller than "mem_max".

When cleaning, first of all the oldest objects of information which are located in the "buffer box" and which are not connected to any other object of information are deleted, and they are "secured" by being earlier copied to a personal computer in a synchronising process.

The invention claimed is:

1. A method for determining information in a hand-held or pocket type electronic device, which method comprises:

recording a first determination of information which is made via a collection of user interface elements for specifically performing such determination of information, the recording of the first determination of information comprises indicating, via said collection of user interface elements, an object of information that is available in the system or creating, via said collection of user interface elements, the new information for a new or existing object of information, presenting selectable information types, of which at least two of the information types address, time, text, picture or sound are present, so that they are directly selectable, which presentation takes place as a result of the first determination of information being finished, recording a choice of an information type from said selectable information types, presenting a collection of user interface elements for specifically performing a determination of information in response to said choice of information type, recording a second determination of information which is made via said collection of user interface elements, the recording of the second determination of information comprises indicating, via said collection of user interface elements, an object of information that is available in the system or creating, via said collection of user interface elements, new information for a new or existing object of information, the objects of information for the first and second determinations of information being different objects, and each object of information for the first and second determinations of information is an individually selectable entity of information which belongs to one, or a combination, of the previously presented information types and are comprising at least one data field and a unique identifier for uniquely identifying the object of information, and automatically linking the second determination of information to the first determination of information by saving a link to the second determination of information in the object of information for the first determination of information or by saving a link to the first determination of information in the object of information for the second determination of information, said automatically linking is performed as a direct result of the recording of the second determination of information.

2. A method as claimed in claim 1, wherein determinations of information that are linked together constitute a virtual object of information collecting, the properties and contents of which are determined by the determinations of information being linked together.

3. A method as claimed in claim 1, further comprising the act of presenting, as a result of a finished determination of information, at least one indicator which identifies at least one recorded determination of information.

4. A method as claimed in claim 1, further comprising the act of presenting, as a result of a finished determination of information, at least one selectable function which is associated with at least one of the linked determinations of information.

5. A method as claimed in claim 1, wherein each object of information comprised an indication of time.

6. A method as claimed in claim 1, further comprising, in the cases when the determination of information regarding an object of information corresponds to inputting of new information, the acts of automatically generating an identity and saving the object of information with said identity in response to the finished inputting of said new information.

7. A method as claimed in claim 1, wherein the act of automatically linking a second determination of information comprises the act of saving a link to the second determination of information in a virtual object of information collecting, in which object a link to the first determination of information is already stored.

8. A method as claimed in claim 1, further comprising the act of presenting information regarding a specific information type, which act further comprises the acts of presenting all the objects of information of the specific information type, also the objects of information of the specific information type that are linked to objects of information of another information type, and sorting, during presentation, the objects of information by an information type which at least is found in a linked object of information of another information type.

9. A method as claimed in claim 1, wherein the saving of a link to the second determination of information in the object of information for the first determination of information includes saving a link to an object of information collecting in the object of information for the first determination of information and saving a link to the second determination in the object of information collecting.

10. A method as claimed in claim 1, wherein the saving of a link to the first determination of information in the object of information for the second determination of information includes saving a link to an object of information collecting in the object of information for the second determination of information and saving a link to the first determination in the object of information collecting.

* * * * *

UNITED STATES PATENT AND TRADEMARK OFFICE
CERTIFICATE OF CORRECTION

| | | |
|---|---|---|
| PATENT NO. | : 7,555,704 B2 | Page 1 of 1 |
| APPLICATION NO. | : 10/475169 | |
| DATED | : June 30, 2009 | |
| INVENTOR(S) | : Siversson | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 476 days.

Delete the phrase "by 476 days" and insert -- by 796 days --

Signed and Sealed this

Fourth Day of May, 2010

David J. Kappos
*Director of the United States Patent and Trademark Office*